United States Patent [19]

Butterbach et al.

[11] Patent Number: 5,512,625
[45] Date of Patent: Apr. 30, 1996

[54] THERMOPLASTIC HOTMELT ADHESIVE

[75] Inventors: Ruediger Butterbach, Essen; Siegfried Kopannia, Duesseldorf; Johannes Andres, Hilden, all of Germany

[73] Assignee: Henkel Kommanditgesellschaft auf Aktien, Duesseldorf, Germany

[21] Appl. No.: 381,846

[22] PCT Filed: Jul. 29, 1993

[86] PCT No.: PCT/EP93/02019

§ 371 Date: Feb. 6, 1995

§ 102(e) Date: Feb. 6, 1995

[87] PCT Pub. No.: WO94/03548

PCT Pub. Date: Feb. 17, 1994

[30] Foreign Application Priority Data

Aug. 6, 1992 [DE] Germany .................. 42 26 081.7

[51] Int. Cl.$^6$ .................. C08K 5/01; C08L 91/08; C08L 23/00
[52] U.S. Cl. .................. 524/490; 524/481; 524/515; 525/240
[58] Field of Search .................. 524/490, 481, 524/487, 515; 525/240

[56] References Cited

U.S. PATENT DOCUMENTS

| | | | |
|---|---|---|---|
| 4,022,728 | 5/1977 | Trotter et al. | 260/27 R |
| 4,120,916 | 10/1978 | Meyer, Jr. et al. | 525/240 |
| 4,186,258 | 1/1980 | Schmidt et al. | 525/342 |
| 4,761,450 | 8/1988 | Lakshmanan et al. | 524/488 |

FOREIGN PATENT DOCUMENTS

| | | |
|---|---|---|
| 2346395 | 10/1977 | France . |
| 2402259 | 7/1975 | Germany . |
| 2530726 | 1/1977 | Germany . |

Primary Examiner—Paul R. Michl
Assistant Examiner—LaVonda R. DeWitt
Attorney, Agent, or Firm—Ernest G. Szoke; Wayne C. Jaeschke; Daniel S. Ortiz

[57] ABSTRACT

A thermoplastic hot-melt adhesive based on a polymer blend of polyolefins is disclosed. An oligomer of an alpha-olefin with at least eight carbon atoms in the monomer and a molecular weight of the oligomer of up to 5,000, as well as other known additives, are added to the known mixture of a substantially amorphous poly-alpha-olefin and of a substantially crystalline poly-alpha-olefin. The impact strength, the viscosity and the flexibility at low temperatures are above all improved in this manner. These hot-melt adhesives are therefore suitable above all for gluing non-polar plastics in the automobile and electric industry.

19 Claims, No Drawings

THERMOPLASTIC HOTMELT ADHESIVE

FIELD OF THE INVENTION

This invention relates to a thermoplastic hotmelt adhesive based on a polymer blend of polyolefins and to its use.

BACKGROUND OF THE INVENTION

Hotmelt adhesives are adhesives which are solid at room temperature and which are applied to the substrates to be joined in the form of a melt, solidifying on cooling after the substrates have been joined together. In the case of thermoplastic adhesives, this operation can be repeated indefinitely because they do not cross-link. They are essentially based on polymers, such as polyamides, polyesters or polyolefins. These polymers critically determine the properties of the adhesive layer in regard to adhesion, strength and temperature behavior. In order to obtain special properties for specific applications, additives are incorporated, for example tackifiers to increase adhesion, plasticizers to increase flexibility, waxes to shorten the open time or crystallization accelerators to improve morphology. However, the properties of the hotmelt adhesives can also be modified as required by mixing basic polymers of the same type or of different types. It is known that polymer blends such as these can increase impact strength and notched impact strength, for example, under certain conditions. Their morphology is crucial in this regard. This morphology is generally composed of a crystalline hard-elastic matrix phase and a disperse soft-elastic phase. On exposure to loads at high deformation rates, the stresses occurring are largely absorbed by the soft-elastic phase.

RELATED ART

It is generally known that polyolefins of the following types can be used as raw materials for hotmelt adhesives: ethylene/vinyl acetate copolymers, ethylene/ethyl acrylate copolymers or polyisobutene. "Polyolefins" in this context are understood to be polymers with the following general structure:

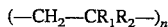

$(-CH_2-CR_1R_2-)_n$ where $R_1$ is mostly hydrogen and $R_2$ is hydrogen or a linear or branched, saturated, aliphatic or cycloaliphatic or aromatic group. The polyolefins also include copolymers thereof with olefins containing hetero atoms, such as acrylic acid, maleic acid or vinyl esters, including their derivatives. Where $R_1$ is hydrogen, the polyolefins are known as poly-α-olefins.

Polyolefins such as these are described, for example, by Schleinzer (cf. Materiaux et Techniques (1990), pages 47–52). Interest centers on terpolymers of ethylene, propylene and but-1-ene. They may be used for lamination, for assembly, in the hygiene field and for packaging and labeling. Various polymer blends are proposed for the particular applications. Thus, up to 30% by weight of tackifiers are said to be added to improve tackiness (see page 49, left-hand column, upper half and page 50, left-hand column, paragraph 4). To increase the softening temperature, melt viscosity and heat resistance, isotactic polypropylene above all is said to be added (see page 49, middle). To make the mixture of the terpolymer and wax less brittle and more compatible, polyisobutylene is said to be added (page 49, left-hand column, middle). Hotmelt adhesives of the terpolymer, a tackifier, a polyethylene wax or a polypropylene wax and, optionally, an additional polyisobutylene are described for packaging purposes (see page 51, right-hand column and page 52). To improve adhesion to polar substrates, such as metal and glass, the amorphous poly-α-olefin may be modified by functional groups (see page 48, right-hand column, second paragraph).

BRIEF DESCRIPTION OF THE INVENTION

Against the background of this prior art, the problem addressed by the present invention was to improve both the production properties and the processing properties of hotmelt adhesives and also their performance properties. In particular, the invention set out to improve toughness, heat resistance, viscosity behavior and low-temperature properties in the range from −30° to +130° C. and preferably above 20° C.

The solution to this problem as provided by the invention is defined in the claims. It is essentially based on the use of an oligomer of α-olefins containing at least 4 carbon atoms in the monomer with a molecular weight (of the oligomer) of up to 5,000 (number average) for the production of a polymer blend containing a substantially amorphous poly-α-olefin and a substantially crystalline polyolefin, preferably a poly-α-olefin.

DETAIL DESCRIPTION OF THE INVENTION

What is meant by "poly-α-olefin" was defined earlier on.

A poly-α-olefin may be regarded as "substantially amorphous" when its degree of crystallization is <30%, as determined by dynamic differential calorimetry (DDC) against a highly crystalline poly-α-olefin standard. Atactic poly-α-olefins with a molecular weight of more than 5,000 of the monomers ethylene, propylene and/or butylene, more particularly terpolymers, are preferred. Comonomers bearing functional groups, for example acrylic acid, maleic acid or vinyl acetate, may also be usefully employed to increase adhesion to polar substrates. The softening temperatures of the substantially amorphous poly-α-olefins are above 50° C. and preferably above 100° C. (ring+ball method according to ASTM E 28). Examples of substantially amorphous poly-α-olefins are Vestoplast (Hüls), APAO types (Hoechst) and Eastoflex (Eastman Chemical Company).

Poly-α-olefins may be classified as "substantially crystalline" when their degree of crystallization is > 55%, as determined by DDC against highly crystalline poly-α-olefin standard. Their ball indentation hardness according to DIN 53456 is less than 85 N/mm². Their crystallite melting point is above 125° C. and preferably above 160° C., as determined by DDC as the melting peak maximum. The substantially crystalline poly-α-olefins may be produced as isotactic polymers using Ziegler-Natta catalysts. The following polymer types may be used: polyethylene, polypropylene, polybutylene or polystyrene. Isotactic polypropylene with a molecular weight of more than 5,000 is preferably used, being commercially available, for example, as Vestolen from Hüls AG.

A poly-α-olefin is "oligomeric" when its molecular weight is below 5,000 and preferably below 1,000 g. The dimer, trimer and/or tetramer of α-olefins containing 8 to 16 carbon atoms is/are preferably used. They are normally prepared by initially oligomerizing ethylene, for example to dec-1-ene. This α-olefin is oligomerized and then normally subjected to working up by distillation and to catalytic hydrogenation to eliminate double bonds. Aliphatic liquids consisting solely of carbon and hydrogen are obtained in this way. The preferred oligo-α-olefin is oligo-dec-1-ene which has the following structure:

where n=2, 3 and/or 4. It can be obtained, for example, from Henkel Corp. (Emery).

The polymer blend according to the invention is solid at room temperature and is suitable as a base for sealants and adhesives applied in molten form. For this purpose, the polymer blend is optimized:

Tackifying resins are added to increase the tackiness of the melt at the application temperature and to increase adhesion. Suitable tackifying resins are aliphatic hydrocarbons, polyterpenes, terpene/phenolic resins and hydrogenated colophony esters. Specific examples are Dertophene (Willers and Engel), Escorez (Exxon), Foral and Kristalex (Hercules), Arkon (Arakawa) and Naros (Nares).

Waxes are added as nucleating agents to influence viscosity and open time, but above all to improve crystallization. The waxes used are polyethylene and polypropylene waxes. Specific examples are Vestowax (Hüls), Epolene (Eastmann), PP-Wachs (Hoechst), Escomer (Exxon) and Techniwax (Dussek Campbell).

Stabilizers are added to reduce oxidative degradation during processing. The stabilizers used are selected from such classes of compounds as sterically hindered phenols, of which a specific example is Irganox (Ciba Geigy).

In addition, other typical additives, for example fillers, pigments, may be incorporated.

The hotmelt adhesives according to the invention have the following composition: 20 to 70% by weight and preferably 35 to 45% by weight of the polymer blend consists of the substantially amorphous poly-α-olefins, 5 to 40% by weight and preferably 10 to 20% by weight of substantially crystalline poly-α-olefin and 5 to 20% by weight and preferably 7 to 15% by weight of oligomeric α-olefin. Tackifiers are used in quantities of 20 to 40 and preferably 25 to 35 parts by weight, nucleating agents and waxes in quantities of 0 to 5 and preferably 2 to 3 parts by weight and stabilizers in quantities of 0 to 1 and preferably 0.1 to 0.2 part by weight, based in each instance on 100 parts by weight of polymer blend.

The blends according to the invention are generally prepared as follows: in a thermo-aluminium block, first the resin and then the amorphous poly-α-olefin are melted at around 180° to 190° C. and homogenized with a stainless steel stirrer to such an extent that a completely smooth film of the mixture can be applied to a suitable film with a suitable rod. The crystalline polyolefin and a stabilizer are then added and homogenized. Finally, the oligo-α-olefin and the nucleating agent are added and homogenized. Other additives, if any, are then incorporated. The whole is homogenized until the test mentioned above again produces a smooth polymer film.

The blends according to the invention have the following advantages over known adhesives without oligo-α -olefin:

1. high impact strength
2. low glass transition temperature and
3. low melt viscosity.

Adhesion to metals and heat resistance are largely unchanged. This affords the following advantages in regard to processing and use: the high flexibility at low temperatures resulting from the low glass transition temperature in conjunction with the high heat resistance of the blends enables them to be used over a wide range of temperatures, particularly in the low temperature range. The high impact strength of the blends coupled with their high heat resistance ensures that bonds remain much more stable on exposure to sudden loads such as can occur, for example, in the event of impact or a fall. Low melt viscosities provide for easier application; for example, blends of the type in question can be applied by small application nozzles. In addition, a low viscosity provides for better wetting on the substrate to be bonded. This in turn provides for better adhesion.

By virtue of the positive properties of the blends according to the invention, the hotmelt adhesives are suitable for bonding apolar plastics, more particularly of polypropylene and polyethylene, and also for bonding polypropylene to metals, for example Al or Cu. Specific articles are power cables, telecommunications cables, electrical plug systems or components of the electrotechnical equipment and bonded assembly joints, for example in the automotive field, such as roofs, foam for head restraints. The hotmelt according to the invention is also particularly suitable for bonding PE/PP pipes of the type used in the wastewater and energy fields.

The invention is described in more detail in the following:

The compositions according to Tables 1 and 2 were processed to a hotmelt adhesive by the general production procedure. To determine their properties, samples were prepared as follows:

Before pouring out into a "Zewaskiner" of siliconized paper, a sample of the blend is removed with a glass rod to prepare a test specimen for determining the melting point. In addition, so-called spot tests (empirical adhesion tests) were carried out with the fresh blend on various materials such as, for example, polypropylene, polyethylene, ethylene/acrylic acid copolymers, aluminium and copper. A small sample of the material poured out and solidified by cooling is cut off for viscosity measurement. Approximately half the remaining material is used to produce a sheet of adhesive in a heated press. This sheet is used to produce test specimens to determine heat resistance. In addition, a small sample for DSC measurement is cut out from this sheet. The other half is processed to test specimens for a flexural impact test.

Determination of Heat Resistance

Two 25.0 mm wide strips of flexible cardboard are bonded with an overlap (overlap length 25.0 mm). The bond is subjected to a load of 13.5 N (0.02 N/mm$^2$) and exposed in a recirculated air drying cabinet to a temperature increase of 5° C./10 mins. Heat resistance is expressed as the temperature at which the bond remains intact.

Determination of Softening Point

The softening point in °C. was measured by the ring+ball method (R+B) according to ASTM E-28.

Measurement of Viscosity

The viscosity in mPa.s was measured with a Brookfield Thermosell RVT viscosimeter (spindle 27) at the temperatures of 180° to 200° C. shown.

Determination of Impact Brittleness

Impact brittleness was determined by the Charpy flexural impact test according to DIN 53453 (May 1975). To this end, standard test specimens with the following dimensions are cut from the samples: length=50 mm, width=15 mm and thickness (height)=10 mm. The test specimens are placed in a pendulum impact tester and exposed to a sudden flexural stress against a support with an internal diameter of 40 mm. A pendulum impact tester up to 15 J was used. The test specimens used were unnotched.

Determination of Adhesion

Adhesion was only subjectively evaluated on the various materials. To this end, a so-called spot test was carried out, a strand of the adhesive being applied to the substrate with a glass rod. An attempt was then made to remove the adhesive by hand.

DSC Measurements

The DSC measurements were carried out under the following conditions: a small sample of around 10 mg of the pressed adhesive sheet was weighed into an Al crucible with a perforated cover. The sample is heated from 0° C. to 200° C. at a heating rate of 10° C./minute (first cycle). After 2 minutes at constant temperature, the sample is cooled to −120° C. at a cooling rate of 10° C./min. This cooling phase is referred to hereinafter as the return phase. The sample is then kept at −120° C. for 2 minutes and subsequently heated to 300° C. at 15° C./min. in a second heating phase (second cycle). Thereafter the sample is not used any further. All thermal effects which occurred during the three phases were subsequently evaluated by software from the experimental data files. The following values were determined: crystallite heat of fusion, crystallite melting peak maximum, crystallite melting peak end, crystallite heat of crystallization, crystallization peak maximum, glass transition temperature.

In all the measurements, except for the viscosity measurement, the corresponding test specimens, bonds or samples were stored for at least 12 hours at room temperature before measurement.

TABLE 1

|  | Examples | | |
|---|---|---|---|
|  | 1 | 2 | 3 |
| Dertophene T 105 | 31.0 | 31.0 | 31.0 |
| Eastoflex P 1060 | 40.0 | | |
| Vestoplast 608 | | 40.0 | |
| Eastoflex P 1824-007 | | | 40.0 |
| Vestolen P 2000 | 15.0 | 15.0 | 15.0 |
| Synfluid PA06 | 11.0 | 11.0 | 11.0 |
| Irganox 1010 | 0.2 | 0.2 | 0.2 |
| Hoechst Wachs PP 230 | 2.8 | | |
| Vestowax H 1 | | 2.8 | |
| Escomer EX 515 | | | 2.8 |
| Softening point [°C.] | 157.7 | 154.4 | 156.4 |
| Viscosity [mPa · s] | | | |
| 180° C. | 8188 | 7875 | 4000 |
| 190° C. | 6438 | 6313 | 3625 |
| 200° C. | 5188 | 5125 | 3000 |
| Heat resistance: [°C.] | 120 | 130 | 100 |
| Impact strength mJ/mm$^2$: | 26.4 | 32.4 | 30.1 |
|  | No failure | No failure | No failure |
| DSC measurement: | | | |
| 1st Cycle: Crystallite heat of fusion [J/g] | 29.2 | 34.8 | 29.8 |
| Return: | | | |
| Heat of crystallization [J/g] | 23.1 | 24.7 | 24.0 |
| Crystallization peak maximum [°C.] | 84.7 | 84.9 | 87.5 |
| Glass transition temperature [°C.] | −32.0 | −32.4 | −30.5 |
| 2nd Cycle | | | |
| Crystallite heat of fusion [J/g] | 23.6 | 27.3 | 28.9 |
| Melting peak maximum [°C.] | 148.5 | 148.3 | 150.1 |
| Glass transition temperature [°C.] | −30.2 | −29.8 | −29.3 |

TABLE 2

|  | Examples | | Comparisons | |
|---|---|---|---|---|
|  | 2 | 4 | | |
| Dertophene T 105 | 31.0 | 31.0 | 34.8 | 34.8 |
| Vestoplast 608 | 40.0 | 40.0 | 47.0 | 47.0 |
| Vestolen P 2000 | 15.0 | 15.0 | 15.0 | 15.0 |
| Irganox 1010 | 0.2 | 0.2 | 0.2 | 0.2 |
| Synfluid PA06 | 11.0 | 11.0 | | |
| Vestowax H 1 | 2.8 | | 3.0 | |
| Hoechst Wachs PP 230 | | 2.8 | | 3.0 |
| Softening point [°C.] | 154.7 | 154.8 | 159.8 | 157.0 |
| Viscosity [mPa · s] | | | | |
| 180° C. | 7875 | 8813 | 17250 | 17500 |
| 190° C. | 6313 | 7063 | 13000 | 13875 |
| 200° C. | 5125 | 5625 | 10250 | 11000 |
| Heat resistance: [°C.] | 130 | 130 | 145 | 145 |
| Impact strength mJ/mm$^2$: | 32.4 | 31.1 | 2.0 | 2.2 |
|  | No failure | No failure | Brittle failure | Brittle failure |
| DSC measurement: | | | | |
| 1st Cycle: Crystallite heat of fusion [J/g] | 34.2 | 30.9 | 45.3 | 40.9 |
| Return: | | | | |
| Heat of crystallization [J/g] | 24.7 | 23.5 | 31.2 | 30.0 |
| Crystallization peak maximum [°C.] | 84.9 | 84.7 | 83.8 | 83.1 |
| Glass transition temperature [°C.] | −32.4 | −33.1 | −17.7 | −18.5 |
| 2nd Cycle | | | | |
| Crystallite heat of fusion [J/g] | 27.3 | 23.7 | 35.3 | 33.0 |
| Melting peak maximum [° C.] | 148.3 | 148.5 | 150.1 | 150.2 |
| Glass transition temperature [°C.] | −29.8 | −30.5 | −15.1 | −16.8 |

Legend to the Tables

| Dertophene T 105 | = terpene/phenolic resin obtainable from Willers & Engel |
|---|---|
| Eastoflex P 1060 | = amorphous poly-α-olefin obtainable from Eastman Chemicals |
| Vestoplast 608 | = amorphous poly-α-olefin copolymer obtainable from Hüls AG |
| Eastoflex P1824-007 | = amorphous poly-α-olefin modified with maleic anhydride |
| Vestolen P 2000 | = isotactic polypropylene obtainable from Hülls AG |
| Synfluid PA06 | = poly-α-olefin (isoparaffinic, highly branched) obtainable from Chevron-Oronite |
| Irganox 1010 | = pentaerythritol tetrakis-[3- |

TABLE 2-continued

| | Examples | | |
|---|---|---|---|
| | 2 | 4 | Comparisons |
| | (3,5-ditert.butyl-4-hydroxyphenyl)-propionate] obtainable from Ciba-Geigy | | |
| Hoechst Wachs PP230 | = polypropylene wax obtainable from Hoechst AG | | |
| Vestowax H1 | = hard paraffin wax obtainable from Hülls AG | | |
| Escomer EX 515 | = polyethylene copolymer wax obtainable from Exxon Chemicals | | |

The tests show that the products according to the invention combine the following advantages with high strength and heat resistance:

Viscosity falls to around half. Resistance to loads involving a high deformation rate is considerably increased. The operating temperature range of the products at low temperatures is increased by more than 10° C.

We claim:

1. A thermoplastic hotmelt adhesive comprising a blend of polyolefins, which comprises:

A) a substantially amorphous poly-α-olefin;
   B) a substantially crystalline poly-α-olefin;
   C) an oligomer of an α-olefin containing 8 to 16 carbon atoms in the monomer, the oligomer having a molecular weight of up to 5,000; and
   D) additives.

2. The hotmelt adhesive as claimed in claim 1, wherein the substantially amorphous poly-α-olefin has a molecular weight above 5,000 and comprises at least one polymer selected from the group consisting of homopolymers, copolymers, and terpolymers comprising residues of at least one monomer selected from the group consisting of ethylene, propylene and butylene.

3. The hotmelt adhesive as claimed in 1, wherein at least one of the substantially amorphous poly-α-olefin and the substantially crystalline poly-α-olefin contain functional groups.

4. The hotmelt adhesive as claimed in claim 2 wherein the substantially crystalline poly-α-olefin comprises isotactic polypropylene with a molecular weight of more than 5,000.

5. The hotmelt adhesive as claimed in claim 1 wherein the oligomer of the α-olefin comprises at least one of a dimer, a trimer and a tetramer of dec-1-one.

6. The hotmelt adhesive as claimed in claim 1 wherein the polymer blend contains 35 to 45% by weight of the substantially amorphous poly-α-olefin, 10 to 20% by weight of the substantially crystalline poly-α-olefin and 7 to 15% by weight of the oligomer of the α-olefin based on the weight of the polymer blend as a whole.

7. A method for bonding apolar plastic articles which comprises applying to at least a first surface of the article to be bonded the hotmelt adhesive of claim 1 and joining the first surface with a second surface to be bonded.

8. The hotmelt adhesive of claim 2 wherein at least one of the substantially amorphous poly-α-olefin and the substantially crystalline poly-α-olefin contain functional groups.

9. The hotmelt adhesive of claim 3, wherein the substantially amorphous poly-α-olefin comprises residues of at least one monomer selected from the group consisting of acrylic acid, maleic acid and vinyl acetate.

10. The hotmelt adhesive of claim 8 wherein the substantially amorphous poly-α-olefin comprises residues of at least one monomer selected from the group consisting of acrylic acid, maleic acid and vinyl acetate.

11. The hotmelt adhesive of claim 3 wherein the substantially crystalline poly-α-olefin comprises isotactic polypropylene with a molecular weight of more than 5,000.

12. The hotmelt adhesive of claim 2 wherein the oligomer comprises at least one of a dimer, a trimer and a tetramer of dec-1-ene.

13. The hotmelt adhesive of claim 3 wherein the oligomer comprises at least one of a dimer, a trimer and a tetramer of dec-1-ene.

14. The hotmelt adhesive of claim 4 wherein the oligomer comprises at least one of a dimer, a trimer and a tetramer of dec-1-ene.

15. The hotmelt adhesive of claim 2 wherein the polymer blend contains 35 to 45% by weight of the substantially amorphous poly-α-olefin, 10 to 20% by weight of the substantially crystalline poly-α-olefin, and 7 to 15% by weight of the oligomer of the α-olefin, based on the weight of the polymer blend as a whole.

16. The hotmelt adhesive of claim 3 wherein the polymer blend contains 35 to 45% by weight of the substantially amorphous poly-α-olefin, 10 to 20% by weight of the substantially crystalline poly-α-olefin, and 7 to 15% by weight of the oligomer of the α-olefin, based on the weight of the polymer blend as a whole.

17. The hotmelt adhesive of claim 4 wherein the polymer blend contains 35 to 45% by weight of the substantially amorphous poly-α-olefin, 10 to 20% by weight of the substantially crystalline poly-α-olefin, and 7 to 15% by weight of the oligomer of the α-olefin, based on the weight of the polymer blend as a whole.

18. The hotmelt adhesive of claim 5 wherein the polymer blend contains 35 to 45% by weight of the substantially amorphous poly-α-olefin, 10 to 20% by weight of the substantially crystalline poly-α-olefin, and 7 to 15% by weight of the oligomer of the α-olefin, based on the weight of the polymer blend as a whole.

19. The method of bonding apolar plastic articles which comprises applying to at least a first surface of the article to be bonded the hotmelt adhesive of claim 2 and joining the first surface with a second surface to be bonded.

* * * * *